March 18, 1969     F. P. FRASCATI     3,433,254
VACUUM CONTROL SYSTEM
Filed June 24, 1966
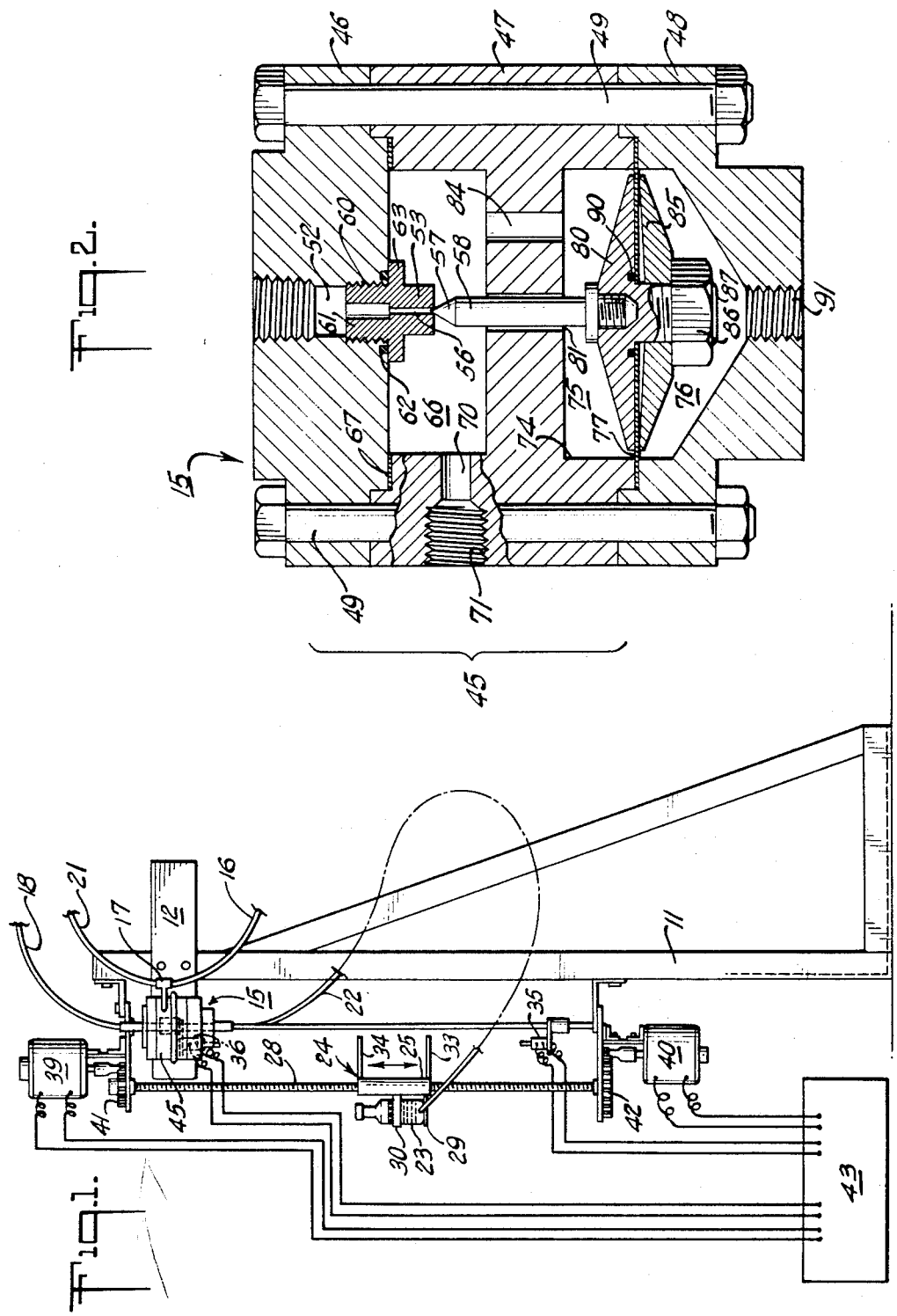

United States Patent Office 3,433,254
Patented Mar. 18, 1969

3,433,254
VACUUM CONTROL SYSTEM
Frank P. Frascati, Fishkill, N.Y., assignor to Texaco Inc.,
New York, N.Y., a corporation of Delaware
Filed June 24, 1966, Ser. No. 560,145
U.S. Cl. 137—505.16                                  5 Claims
Int. Cl. F16k 31/12, 31/36

ABSTRACT OF THE DISCLOSURE

A system for controlling the amplitude of a vacuum, which system employs a diaphragm-controlled valve. A low pressure source for producing a vacuum is connected to one side of the valve, and the vacuum is connected to the other side. The other side of the valve is also connected to one side of the diaphragm. And, the other side of the diaphragm is connected to a reproducibly controlled variable vacuum of predetermined amplitude.

---

This invention concerns appaartus for controlling a pressure change, in general. More specifically, the invention relates to a vacuum control system providing for reproducible vacuum variations.

A need has been found for providing a variable vacuum in a test chamber, which vacuum may be varied according to a predetermined plan that is exactly reproducible. Heretofore, controllers for controlling variation in a low pressure or vacuum vessel or the like were relatively inaccurate. Consequently, it has been difficult to control any variations in the amount of vacuum being applied to a given vessel. Thus, prior results have been inexact, particularly as to rate of change; and furthermore a given change rate was not reproducible thereafter, so that under repetitive test conditions the required accuracy and exactitude of vacuum change for reproducing identical conditions was not possible. In order to overcome such difficulties a vacuum control system according to this invention was developed.

Consequently, it is an object of this invention to provide a vacuum control system for controlling a rate of variation in the vacuum applied to a given evacuated chamber or the like that is exact and reproducible.

Briefly, the invention concerns a vacuum control system having a diaphragm actuated control valve therein. The system comprises in combination a means for connecting a source of vacuum to one side of said valve, and a means for connecting a unit to be evacuated to the other side of said valve. The system also comprises a means for also connecting said other side of said valve to one side of said diaphragm, and a means for applying variable controlled vacuum to the other side of said diaphragm.

Again briefly, the invention relates to a vacuum control system for providing a reproducible predetermined reduced pressure in a unit to be evacuated. The said pressure being one that changes at a given rate. The system comprises in combination a diaphragm actuated needle valve unit, and the unit comprises a body member, a valve seat orifice, a needle having a point for cooperating with said valve seat, and an inlet passage for a source of vacuum connecting with said orifice. The diaphragm unit also comprises a first enclosed chamber in said body member which surrounds said needle point and orifice, an outlet passage for connecting said first chamber with said unit to be evacuated, and a diaphragm dividing a second enclosed chamber in said body member into two compartments. One of the said compartments is adjacent to said first chamber, and there is a passageway connecting said adjacent compartment with said first chamber. The needle valve unit also comprises a clamp for supportably attaching said needle to said diaphragm, and a passage means for connecting said other compartment with a source of said predetermined reduced pressure. In addition, the system comprises a first conduit means for connecting a source of vacuum to said inlet passage, a second conduit means for connecting said unit to be evacuated to said outlet passage, and a third conduit means for connecting a bleed source of gas under at least atmospheric pressure to said outlet passage. Also, the system comprises a quantity of mercury for filling said other compartment and at least part of a reservoir, a fourth conduit means for connecting said other compartment passage means to said reservoir and containing said mercury therein, and a vertically movable support means for said reservoir. Additionally, the system comprises a threaded shaft for moving said reservoir support means and a pair of electric motors one connected to each end of said threaded shaft for rotating said shaft in opposite directions in order to move said reservoir in either direction for determining the amplitude of the said reduced pressure in terms of inches of mercury.

The foregoing and other objects and benefits of the invention will be set forth in greater detail below in connection with the best mode now contemplated by the inventor for carrying out the invention, and in connection with which there are illustrations provided in the drawings, wherein:

FIG. 1 is a side elevation showing the system according to this invention as mounted on a supporting stand; and FIG. 2 is an enlarged vertical cross-section of the diaphragm-valve unit according to this invention.

Referring to FIG. 1, it is pointed out that the principal elements of a system according to this invention are illustrated. These provide for having a vacuum control applied to a given unit (not shown) that is to be evacuated. These elements of the control system are mounted on any convenient structure, such as a stand 11 that has mounted thereon a bracket 12 to which is attached a diaphragm actuated control-valve unit 15. This diaphragm-valve unit 15 acts as a vacuum regulator to determine the amount of vacuum that is applied to a vessel (not shown) or other unit connected onto a flexible tube 16 that connects into the valve unit 15 via a T connector 17.

A vacuum pump (not shown) or other source of reduced pressure (vacuum) is connected to a flexible tube 18. This tube 18 leads into the regulator-valve unit 15. Consequently, the amount of vacuum to be drawn from the unit connected to tube 16 may be determined by the regulator 15. It may be noted that there is another flexible tube 21 which leads to the other side of the T-connector 17. This tube 21 has a bleed source (not shown) of inert gas connected thereto, the purpose of which will be described in greater detail hereafter.

There is another flexible tube 22 connected to the bottom of the valve unit 15. This leads from the valve unit to a mercury jar or reservoir 23. The vertical location of reservoir 23 is determined by the position of a clamp-and-support 24 that has an internally threaded body portion 25. Body 25 is supported by and has its vertical position determined in connection with rotation of a threaded shaft 28.

Attached to the body 25 of the clamp-and-support 24 there is a support tray 29 upon which the reservoir or jar 23 rests. Also attached to body 25 there is a clamp 30 for holding the jar 23 securely in place. Extending from the other side of the body 25 from the jar 23, there are a pair of arms 33 and 34 that reach out into the path of a pair of vertical position limit-switches 35 and 36 respectively.

There are two electric motors 39 and 40 that are connected via appropriate gear trains, as illustrated, to the upper and lower ends respectively of the threaded shaft 28. It may be noted that in the illustrated embodiment of this invention the gear train connection from motor 39 to the top of shaft 28 employs a smaller diameter gear 41 than the corresponding larger diameter gear 42 that is employed in connection with the other motor 40. In this manner the rate of change of the vertical position for the level of mercury in the reservoir 23 is more rapid as it is moved downward, than when it has reversed and is moving upward under the control of the other motor 40. The electrical control for turning these motors off and on is conventional and a time cycle controller 43 is schematically indicated with connections to the motors and to the limit-switches 35 and 36. It will be appreciated by one skilled in the art that various other arrangements might be employed, depending upon the desired rates of change of vacuum to be applied to the system.

The details of the diaphragm-valve unit 15 are illustrated in FIG. 2. It will be observed that there is a body member 45 that is made up of three sections 46, 47 and 48. These may be fastened together in any convenient manner, e.g., by means of a plurality of bolts 49 near the circumference of the unit.

In the upper section 46 there is a passage 52 that is tapped to provide threads (as illustrated) in order to attach the flexible tube 18 (see FIG. 1) thereto. At the the lower end of passage 52 there is a valve seat insert 53 that has a centrally located orifice 56 therein. The lower edge of the orifice 56 acts as the seating surface for the valve which is created by a point 57 at the tip or upper end of a needle or rod 58 which is situated in axial alignment with the orifice 56.

The valve seat insert 53 may be attached to the upper section 46 in any feasible manner, e.g. by having a threaded extension 61 on the insert 53, that screws into a female threaded portion 60 of passageway 52 at the lower end thereof (when viewed as illustrated).

There is a groove 62 in that part of the section 46 that surrounds the lower threaded end 60 of passage 52. This groove 62 is covered by a flange 63 which is integral with the body of valve seat insert 53 so that a tight seal may be provided by having some soft material (not shown) in the groove 62 to create a vacuum tight seal when the insert 53 is screwed into place in the upper section 46. Also for the same purpose of creating a vacuum tight seal with respect to a chamber 66 within the body 45, there is a gasket 67 that is clamped between bearing surfaces on the edges of the chamber 66 between the sections 46 and 47.

It will be observed that there is another passage 70 that connects from the chamber 66 to the outside of the body 45. This extends through the middle section 47 and has a tapped portion 71 to which the T connector 17 (FIG. 1) may be attached. This passage 70 acts as an outlet passage for connecting the chamber 66 with the unit (not shown) that is to be evacuated via flexible tube 16.

There is a lower chamber 74 that is formed within both the middle and lower sections 47 and 48 of the body 45 of the valve unit 15. This chamber 74 is divided into two compartments 75 and 76 by a diaphragm 77. The diaphragm 77 is clamped at the edges thereof between bearing surfaces respectively formed at the lower edge on middle section 47, and at a corresponding upper edge on lower section 48. The central portion of the diaphragm 77 supports a clamp 80 that has the needle 58 securely attached thereto for movement therewith at all times.

It will be noted that the needle 58 extends vertically above the clamp 80 through an opening 81 that connects the compartment 75 with the chamber 66, and allows needle 58 free movement therein without any frictional resistance. In addition, there is another pasageway 84 that connects between the compartment 75 and the chamber 66 in order to provide free equalization of pressures in both of these chambers.

Clamp 80 is made up with a lower conical section 85 designed to provide a tight clamping action onto the diaphragm 77. This is accomplished when a nut 86 is threaded onto a threaded extension 87 which is an integral part of the clamp 80 (to which the needle 58 is securely attached). In order to insure a tight vacuum seal between chambers 75 and 76, there is a groove 90 located in the clamp 80 near the inner edges of the diaphragm 77 where it surrounds the extension 87. There will be, of course, a seal ring (not shown) or other soft sealing material within the groove 90 to provide the desired sealing action. The upper surface of the lower section 85 may be made with a shallow cone shaped surface, if desired, in order to provide an even clamping pressure on the diaphragm 77 when under pressure created by the tightening of the nut 86.

From the lower compartment 76 there is a passage 91 that connects from the compartment 76 to the outside of lower section 48 so that a source of controlled vacuum (or a regulated amount of reduced pressure) may be connected to the compartment 76. As indicated in FIG. 1 such reduced pressure or vacuum control is created by having the flexible tube 22 connected to passage 91. As will be more fully explained below, the compartment 76 will be filled with a quantity of mercury (see FIG. 1) and the differential between the level of mercury in compartment 76 and the level thereof in the jar or reservoir 23 will determine the vacuum in terms of inches of mercury.

*Operation*

Before the vacuum control unit or system is placed in operation, it is necessary to fill the compartment 76 (FIG. 2), flexible tube 22, and jar 23 with mercury. This is readily accomplished by inverting the total unit from its normal operating position and then pouring mercury into the jar 23 so as to fill first the compartment 76 below diaphragm 77 and then all of the flexible tube 22 until the level of mercury in jar 23 is about 1 inch above the opening in the jar to which flexible tube 22 is connected. When mercury has thus been placed into the system, the unit may be righted and the jar 23 is placed on its support and clamped securely in place by the clamp 30.

Thereafter depending upon the relative position of the jar 23 (and the level of the mercury therein) with respect to the diaphragm 77 (or the level of mercury thereunder in the compartment 76), the degree of low pressure or vacuum that is applied to the diaphragm 77 on the underside thereof will be determined. Consequently, a predetermined variation, or rate of change of vacuum may be applied to the underside of the diaphragm 77 by energizing the motors 39 and 40. For example, it may be desired to apply a straight line increase in vacuum from atmospheric to a given amount of vacuum, followed by a return at a slower rate (straight line change) after any predetermined time at the given low pressure. This would be accomplished by first energizing the top motor 39 which is arranged to cause the jar 23 to be moved down at a particular rate. After the jar 23 has been moved down a predetermined distance so as to reach a given vacuum in terms of inches of mercury, it may be moved upward again by energiizng the lower motor 40. In the illustrated arrangement motor 40 and the drive coupling therefor is set to drive the shaft 28 at a lower speed of rotation and consequently will return the vacuum being applied to the diaphragm 77 back to zero at a slower rate.

The operation of the vacuum control system may be briefly described in relation to the movement of the vacuum control jar or reservoir, as follows. As the reservoir 23 begins to move down, the pressure in the compartment 76 is lowered. Since the pressure above the diaphragm 77 (in the compartment 75 and connected chamber 66) is higher, the diaphragm 77 is pushed down and consequently the needle 58 of the valve is moved away from the valve seat at the lower end of orifice 56. This then allows the vacuum pump, or other source of low pressure, to reduce the pressure in the chamber 66 and at the same time reduce the pressure in the unit (not shown) that is connected for having the vacuum therein controlled. The unit is connected through the passage 70 and the connected flexible tubing 16.

If the consequent pressure in the unit and compartment or chamber 66 is lowered too fast then the pressure in the compartment 76 will be higher and the diaphragm 77 and needle 58 will move up closing the opening in orifice 56 and thereby sealing off the vacuum pump suction.

The foregoing regulation, or maintenance of a pressure change rate will continue until the pressure in the compartment 76 is again lower than that in the compartment 75 (and chamber 66) which will be due to the fact that the mercury reservoir 23 is continuing to move down. When the pressure thus becomes lower the valve at the tip of needle 58 will again open and allow the vacuum pump to pull down the pressure in the connected reservoir, or unit having its pressure controlled, in the desired manner.

When the mercury reservoir or jar 23 reaches a predetermined low point, such that there are a desired number of inches of mercury, i.e., amount of vacuum on the unit (not shown) having its pressure controlled; the switch 35 will shut off the upper motor 39. Then, of course, the vacuum will be maintained at this level and it may be so maintained for any given period of time, as desired, by merely holding the mercury reservoir 23 at this level.

When it is time to return the test unit pressure to atmospheric once more, the bottom motor 40 is energized and the mercury reservoir or jar 23 begins to rise. This causes the pressure in the compartment 76 to increase which causes the diaphragm 77 to move up and close the valve at the tip 57 of needle 58. Because of the small gas bleed (gas introduced in the upper chamber 66 via the T connector 17 and the flexible tube 21) into the reservoir or unit (not shown) having the vacuum therein controlled, the pressure in the unit under control will rise also. However, if such pressure tends to rise too rapidly it will exceed the rise created by the upward movement of the mercury level in reservoir 23, and thus it will push down on the diaphragm 77 and cause the opening of the valve at the tip 57 of the needle 58, once more. This will allow the vacuum pump to reduce the pressure again and thus it will keep the pressure at the amount of vacuum determined by the differential between the mercury surface in the reservoir or jar 23 and the top of the mercury column within the compartment 76. After the jar 23 and its supporting member 24 has reached the starting position, it will actuate the other switch 36 and shut off the bottom motor 40.

The starting and stopping of the upper and lower motors 39 and 40, as well as the length of time for holding the vacuum at the maximum, are all controllable in any feasible manner. Preferably the time cycle controller 43 will be employed. This will automatically control these periods as desired. It will be appreciated that the time cycle controller forms no part, per se, of this invention.

While the particular embodiment illustrated and described above has been developed and employed in connection with a vacuum or low pressure test system, it will be clear to anyone skilled in the art that the principles are applicable to other and similar arrangements and for different purposes. It will be observed that the system according to this invention provides for an accurately reproducible control that is steady and smooth for creating a straight line change, or otherwise if desired.

While a preferred embodiment of the invention has been described above in considerable detail in accordance with the applicable statutes, this is not to be taken as in any way limiting the invention but merely as being descriptive thereof.

I claim:
1. A vacuum control system for providing a reproducible predetermined reduced pressure in a unit to be evacuated and said pressure changing at a given rate, said system comprising in combination:
  a diaphragm actuated needle valve unit, said unit comprising
  a body member,
  a valve seat orifice,
  a needle having a point for cooperating with said valve seat,
  an inlet passage for a source of vacuum connecting with said orifice,
  a first enclosed chamber in said body member and surrounding said needle point and orifice,
  an outlet passage for connecting said first chamber with said unit to be evacuated,
  a diaphragm dividing a second enclosed chamber in said body member into two compartments,
  one of said compartments being adjacent to said first chamber,
  a passageway connecting said adjacent compartment with said first chamber,
  a clamp for supportably attaching said needle to said diaphragm, and
  passage means for connecting said other compartment with a source of said predetermined reduced pressure,
  first conduit means for connecting a source of vacuum to said inlet passage,
  second conduit means for connecting said unit to be evacuated to said outlet passage,
  third conduit means for connecting a bleed source of gas under at least atmospheric pressure to said outlet passage,
  a quantity of mercury for filling said other compartment and at least part of a reservoir,
  a fourth conduit means for connecting said other compartment passage means to said reservoir and containing said mercury therein,
  vertically movable support means for said reservoir,
  a threaded shaft for moving said reservoir support means, and
  a pair of electric motors one connected to each end of said threaded shaft for rotating said shaft in opposite directions to move said reservoir in either direction for determining the amplitude of the said reduced pressure in inches of mercury.

2. A vacuum control system having a diaphragm actuated control valve therein, and comprising in combination:
  means for connecting a source of vacuum to one side of said valve,
  means for connecting a unit to be evacuated to the other side of said valve,
  means for connecting a bleed source of gas under pressure to said unit,
  means for also connecting said other side of said valve to one side of said diaphragm,
  means for applying a variable controlled vacuum to the other side of said diaphragm, and
  means for scheduling said controlled vacuum in order to provide a predetermined rate of change which may be reproduced comprising a liquid column having a variable negative head relative to said other side of said diaphragm.

3. A vacuum control system according to claim 2 wherein said liquid column is mercury.

4. A vacuum control system according to claim 3 wherein said controlled vacuum means further comprises motor means for varying said negative head at a predetermined reproducible rate.

5. A vacuum control system according to claim 4 wherein said motor means comprises two electric motors one for increasing and the other for decreasing said negative head, and wherein said controlled vacuum means further comprises limit switches and a timer for controlling activation of said motors.

References Cited

UNITED STATES PATENTS

| | | | |
|---|---|---|---|
| 602,548 | 4/1898 | Williams et al. | 137—505.14 |
| 1,354,311 | 9/1920 | Landrum | 137—445 XR |
| 1,515,648 | 11/1924 | Arnold. | |
| 1,744,290 | 1/1930 | Weber | 137—505.16 |
| 3,111,957 | 11/1963 | Broughton | 137—116.3 |

FOREIGN PATENTS 230,266  3/1925  Great Britain.

HAROLD W. WEAKLEY, *Primary Examiner.*

U.S. Cl. X.R.

137—624.14